United States Patent [19]

Otto et al.

[11] Patent Number: 4,618,355
[45] Date of Patent: Oct. 21, 1986

[54] METHOD AND APPARATUS FOR SEALING A MOUNT IN A CATHODE RAY TUBE

[75] Inventors: Jack F. Otto; Michael A. Colacello, both of Trenton, N.J.

[73] Assignee: RCA Corporation, Princeton, N.J.

[21] Appl. No.: 793,313

[22] Filed: Oct. 31, 1985

[51] Int. Cl.⁴ .................................. C03B 23/217
[52] U.S. Cl. .............................. 65/36; 65/108; 65/113; 65/270; 65/271; 65/284; 65/285; 65/252
[58] Field of Search .............. 65/36, 40, 65, 113, 65/120, 252, 270, 271, 108, 284, 285

[56] References Cited

U.S. PATENT DOCUMENTS

| | | | |
|---|---|---|---|
| 2,725,678 | 12/1955 | Weingarten | 49/2 |
| 2,883,797 | 4/1959 | Eldred | 49/7 |
| 4,231,777 | 11/1980 | Lynch et al. | 65/120 X |
| 4,561,874 | 12/1985 | Colacello et al. | 65/36 |
| 4,568,372 | 2/1986 | Soulard | 65/65 X |

OTHER PUBLICATIONS

U.S. patent application Ser. No. 771,355, filed Aug. 30, 1985 entitled Apparatus for Sealing a Mount in a Cathode-Ray Tube, now U.S. Pat. No. 4,589,902.

Primary Examiner—Arthur Kellogg
Attorney, Agent, or Firm—E. M. Whitacre; D. H. Irlbeck; T. H. Magee

[57] ABSTRACT

A method for sealing a mount including a wafer in a neck of a stationary cathode-ray tube comprises positioning a first tier of burner tips completely around the neck such that the burner tips are aimed nonradially along directions tangent to a first circle, the plane of the first circle being aligned along the wafer. The first tier of burner tips is split into at least first and second radial segments, each segment being connected to means for moving the segment toward and away from the neck. The first tier of burner tips, while remaining stationary, provide a vortical pattern of flames around the neck. The radial segments are then removed from around the stationary neck sufficiently to allow the tube to proceed along a conveyor line.

14 Claims, 7 Drawing Figures

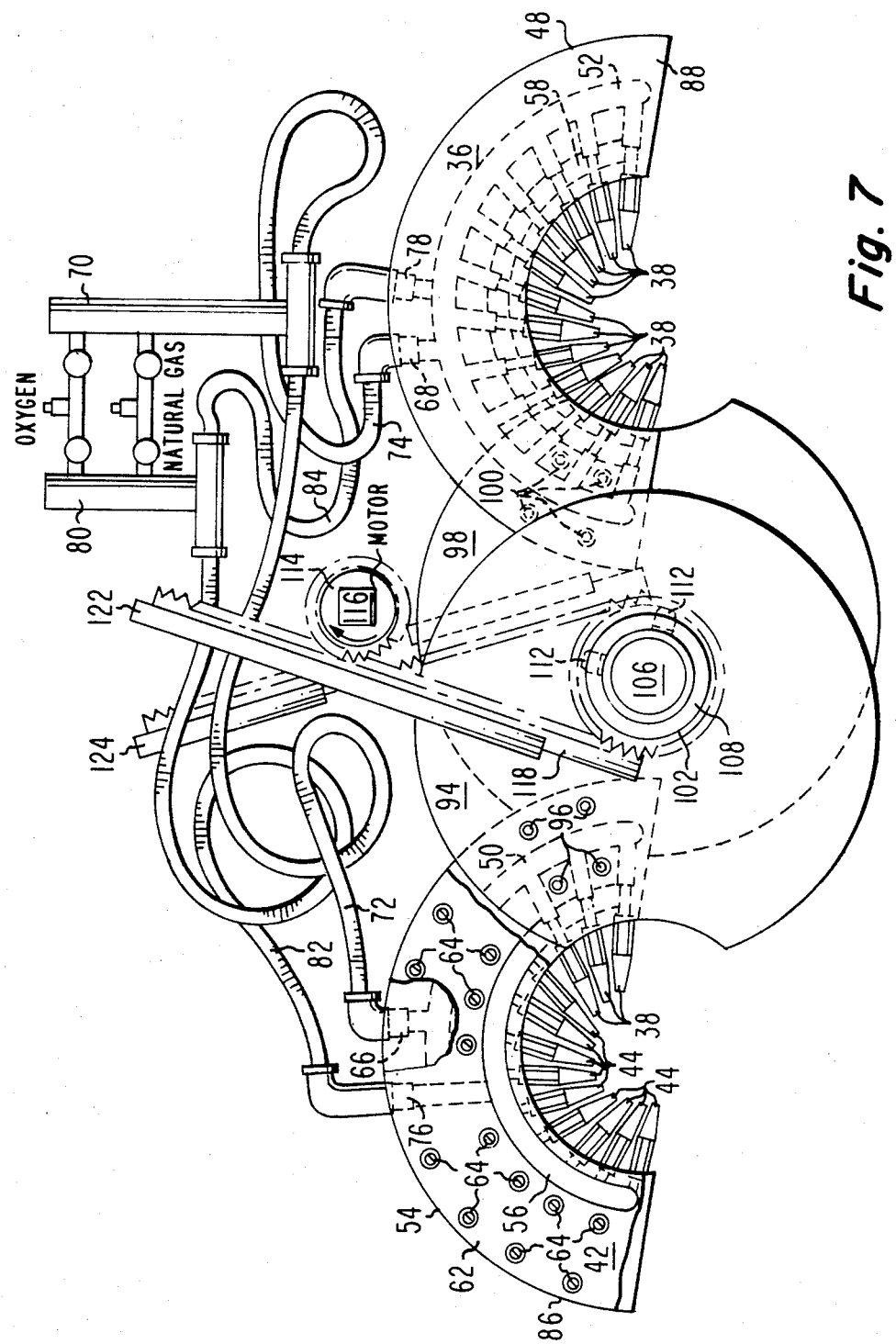

METHOD AND APPARATUS FOR SEALING A MOUNT IN A CATHODE RAY TUBE

BACKGROUND OF THE INVENTION

This invention pertains to a method and apparatus for heat sealing an electron gun mount, including a glass stem wafer, into a neck of a stationary cathode-ray tube having a circular cross-section.

A standard cathode-ray tube (CRT) comprises a faceplate panel with a cathodoluminescent screen, a funnel having a protruding neck, and a mount containing an electron gun adapted to emit one or more beams of electrons for striking the screen. The mount includes a glass stem wafer on which the gun is mounted with lead wires for the gun electrodes projecting through the wafer. Round portions of glass called "fillets" surround the lead wires at the glass wafer to provide a better seal around the lead wires. The funnel typically is sealed to the faceplate panel in a high-temperature oven using a glass frit before the mount is sealed to the neck of the funnel. After the frit-sealing step, the mount is seated to the neck by a heat-sealing apparatus which applies high-temperature flames to a localized area around the neck where the seal is to be formed.

During this mount-sealing process, the CRT is typically held in a vertical panel-up position by a cradle on a "carrousel". The wafer with the gun mounted thereon is upwardly inserted into the neck by a mount socket. The mount is aligned, so that the gun electrodes are aimed to properly strike the cathodoluminescent screen, and held thereat by the mount socket while heat from burners is applied to the outside of the neck proximate the wafer. The CRT and wafer are rotated about a vertical central axis as they are indexed to various stationary burner locations around the carrousel. At these locations, the burners are positioned around the vertical central axis of the CRT neck so that the neck softens, thins, and then seals to the wafer. Also, excess neck material that is lower than the wafer (cullet) is cut off and falls away from the neck.

Presently, there is a trend toward larger CRTs. This means that the carrousel and the rotating machinery, including two vertical support bars for the CRT, must be relatively large and heavy and, therefore, more expensive. Furthermore, the two vertical support bars interfere with the placement of an electrical resistance oven around the CRT neck for a preferred preheating step before the wafer-sealing operation and an annealing step after sealing. Thus, additional burners are required to perform these steps instead of the resistance oven. This requires additional carrousel locations, and the heating provided by the burners is not as uniform as that provided by the resistance oven.

In order to accomodate larger CRTs, our copending application entitled APPARATUS FOR HEAT SEALING A GUN MOUNT IN A CRT NECK, Ser. No. 648,809, filed on Sept. 10, 1984 now U.S. Pat. No. 4,561,874 and assigned to RCA Corporation, teaches a specific method which achieves the aforementioned mount-sealing operation at a single stationary location and obviates the need for the carrousel and heavy rotating machinery. This method comprises heating completely around a nonrotating CRT neck by providing a vortical pattern of flames around the neck from a plurality of nonrotating burner tips similarly aimed nonradially along directions tangent to points substantially halfway between the outside diameters of the neck and the wafer. The flames are provided, firstly, above the plane of the wafer to cause a reduction in the diameter of the neck; secondly, below the plane of the wafer to cut off excess material from the neck; and thirdly, in the plane of the wafer, i.e., the "seal plane". Consequently, in achieving a successful mount-sealing operation at a single stationary location without the need for the carrousel and heavy rotating machinery, it was necessary to raise and lower the burner tips relative to the cathode-ray tube. The present invention provides a method and apparatus for performing the neck-in, cut-off and sealing operations on a stationary CRT held at a fixed location along a conveyor line without having to raise or lower the burner tips.

SUMMARY OF THE INVENTION

A method for sealing a mount including a wafer in a neck of a stationary cathode-ray tube comprises positioning a first tier of burner tips completely around the neck such that the burner tips are aimed nonradially along directions tangent to a first circle, the plane of the first circle being aligned along the wafer. The first tier of burner tips is split into at least first and second radial segments, each segment being connected to means for moving the segment toward and away from the neck. The first tier of burner tips, while remaining stationary, provide a vortical pattern of flames around the neck. The radial segments are then removed from around the stationary neck sufficiently to allow the tube to proceed along a conveyor line.

BRIEF DESCRIPTION OF THE DRAWING

FIG. 7 is a plan view of the apparatus shown in FIG. 1 at a particular step of the present mount-sealing method.

DETAILED DESCRIPTION OF THE PREFERRED EMBODIMENT

Figure 1:
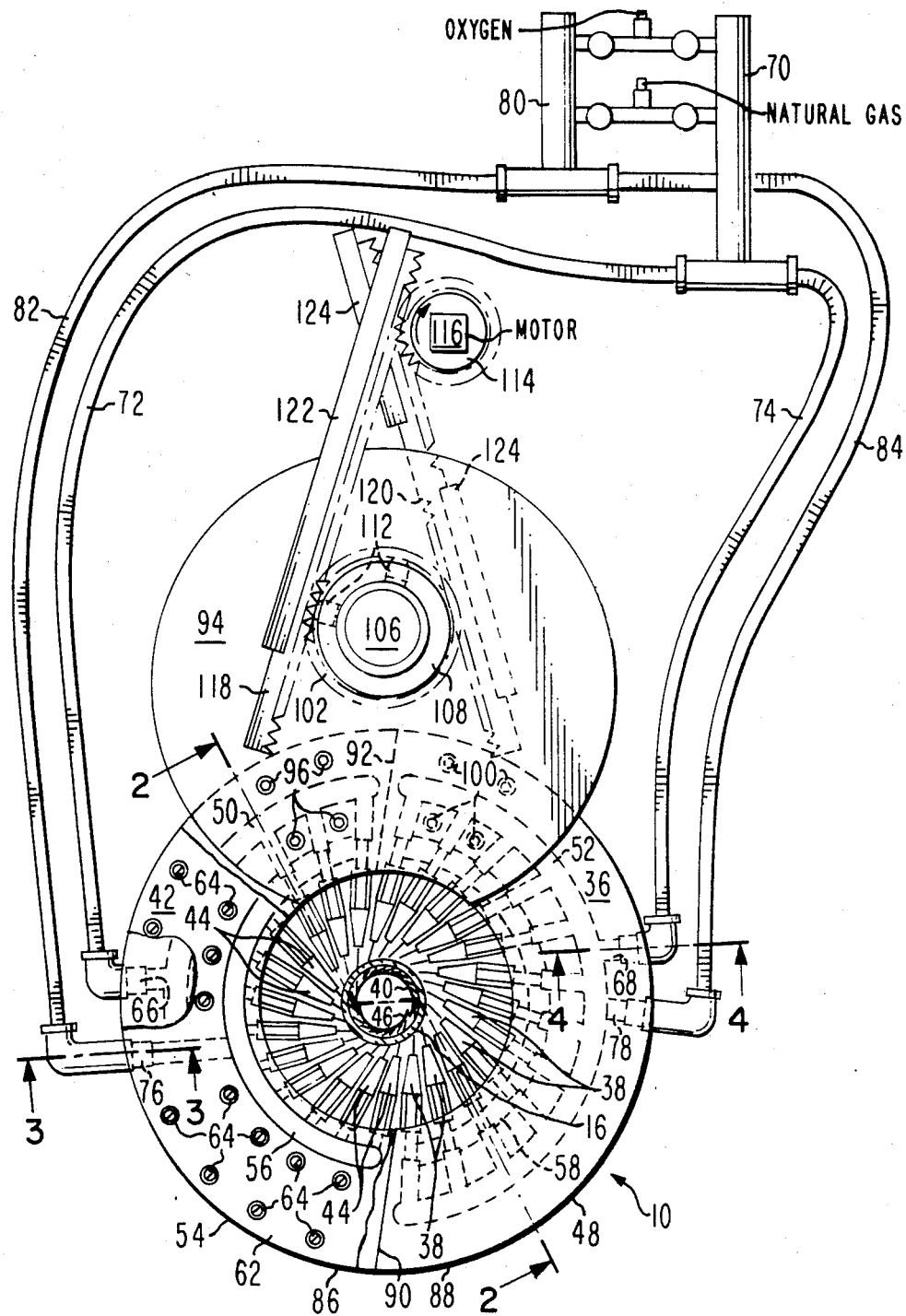
FIG. 1 is a partially cut-away plan view of an apparatus utilized to perform the present mount-sealing method.
Figure 2:
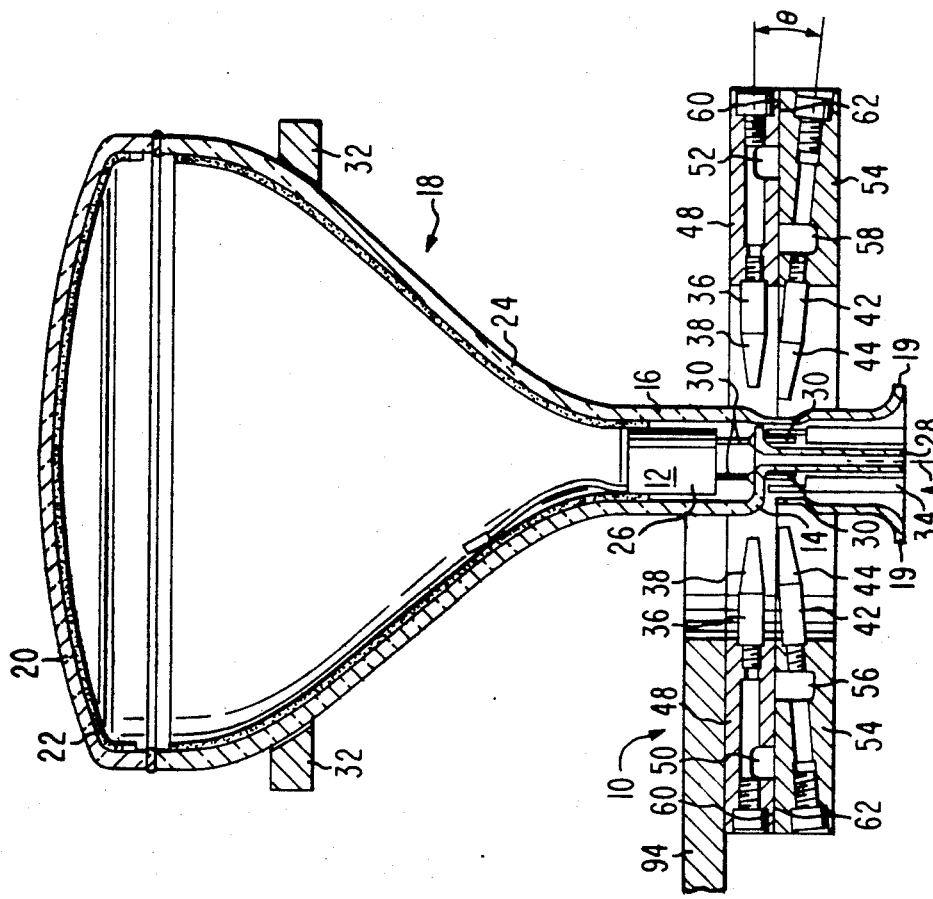
FIG. 2 is a cross-sectional view taken along line 2—2 of FIG. 1.

FIGS. 1 through 6 of the drawing show an apparatus 10 for heat sealing an electron gun mount 12, including a glass stem wafer 14, into a neck 16 of a cathode-ray tube (CRT) 18 which is flared at the end 19 thereof. As shown in FIG. 2, the CRT 18 comprises a faceplate panel 20 with a cathodoluminescent screen 22, a funnel 24 having the protruding neck 16, and the mount 12 containing an electron gun 26. The mount 12 includes a glass stem 28 integrally connected to the glass wafer 14 upon which the gun 26 is mounted with lead wires 30. The CRT 18 is oriented in a panel-up position along a vertical central axis A, as shown in FIG. 2, and held thereat by a stationary cradle 32. The mount 12 is supported by a mount socket 34 into which the ends of the lead wires 30 are inserted.

The heat-sealing apparatus 10 comprises a first tier 36 of burner tips 38 disposed completely around the neck 16 at a first distance therefrom and similarly aimed nonradially along directions tangent to a first circle 40. A second tier 42 of burner tips 44 is disposed completely around the neck 16 below the first tier 36 at a second distance from the neck 16. The burner tips 44 are aimed nonradially along directions tangent to a second circle 46. As shown by FIG. 2, the first distance is greater than the second distance. Also, the diameter of the first circle 40 is greater than the diameter of the second circle 46. Preferably, each of the tiers 36 and 42 has twenty-four burner tips therein, the inserts of which were manufactured as burner tips No. P-1 by J&P Machine and Tool Company, Clifton, New Jersey. The holders for the burner tips were custom machined so as to allow twenty-four tips to fit around each circle 40 and 46.

The burner tips 38 of the first tier 36 are aimed along the plane of the first circle 40, and the burner tips 44 of the second tier 42 are aimed toward the plane of the first circle 40 at a predetermined angle $\theta$. For heat-sealing a mount 12 in the neck 16 of a CRT 28 having an outer neck diameter of twenty-nine millimeters, the diameter of the first circle 40 should be about twenty-two millimeters and the diameter of the second circle 46 should be about eighteen millimeters. Preferably, the first distance is approximately seven millimeters and the second distance is approximately four millimeters. In the present embodiment, the ends of the burner tips 44 in the second tier 42 are approximately seven millimeters below the plane of the first circle 40, and the predetermined angle $\theta$ is about six degrees.

The first tier 36 of burner tips 38 is connected to means for providing a first combustible gas mixture, such as a first circular manifold 48. The first manifold 48 has a pair of chambers 50 and 52, each chamber communicating with half of the twenty-four burner tips 38. The second tier 42 of burner tips 44 is connected to means for providing a second combustible gas mixture different from the first mixture. The providing means connected to the second-tier of burner tips 44 comprises a second circular manifold 54 which has a pair of chambers 56 and 58, each chamber communicating with half of the twenty-four burner tips 44. In the present embodiment, each of the chambers 50, 52, 56 an 58 comprises a substantially semicircular groove disposed adjacent a planar surface 60 and 62 of the respective manifold 48 and 54. The planar surfaces 60 and 62 of the manifolds 48 and 54 are attached adjacent to each other using machine screws 64, such that the planar surface 60 or 62 of one manifold 48 or 54 forms the chamber walls opposite the semicircular grooves disposed in the other manifold 54 or 48, thereby defining the boundary for each of the chambers 50, 52, 56 and 58.

Figure 3:
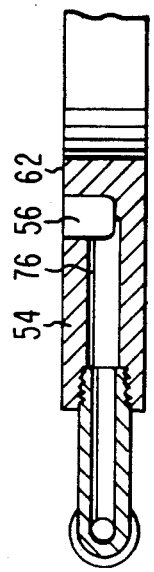
FIG. 3 is a cross-sectional view taken along line 3—3 of FIG. 1.
Figure 4:
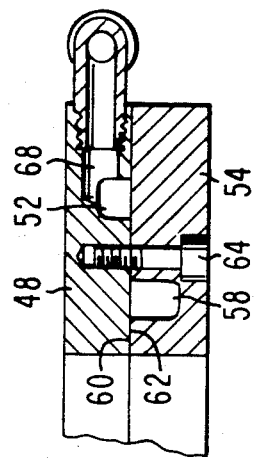
FIG. 4 is a cross-sectional view taken along line 4—4 of FIG. 1.

FIGS. 3 and 4 illustrate how the chambers 52 and 56 receive the first and second combustible gas mixtures, respectively. The first manifold 48 has a pair of similar inlet ports 66 and 68 disposed therein and communicating, respectively, with the chambers 50 and 52 of the first manifold 48. The inlet ports 66 and 68 of the first manifold 48 are connected to a first gas premixer 70 via flexible lines 72 and 74, respectively, which are identical in length and inside diameter. The second manifold 54 also has a pair of similar inlet ports 76 and 78 disposed therein and communicating, respectively, with the chambers 54 and 56 of the second manifold 54. The inlet ports 76 and 78 of the second manifold 54 are connected to a second gas premixer 80 via flexible lines 82 and 84 respectively, which are identical in length and inside diameter. The premixers 70 and 80 receive a supply of oxygen and fuel, such as natural gas, and provide the first and second combustible gas mixtures, respectively, to the first and second tiers 36 and 42 of burner tips 38 and 44. The use of a single premixer 70 and 80 and the identical dual feed lines 72, 74, 82 and 84, for each tier 36 and 42 results in a uniform temperature distribution being provided by that tier 36 and 42 around the neck 16.

Figure 5:
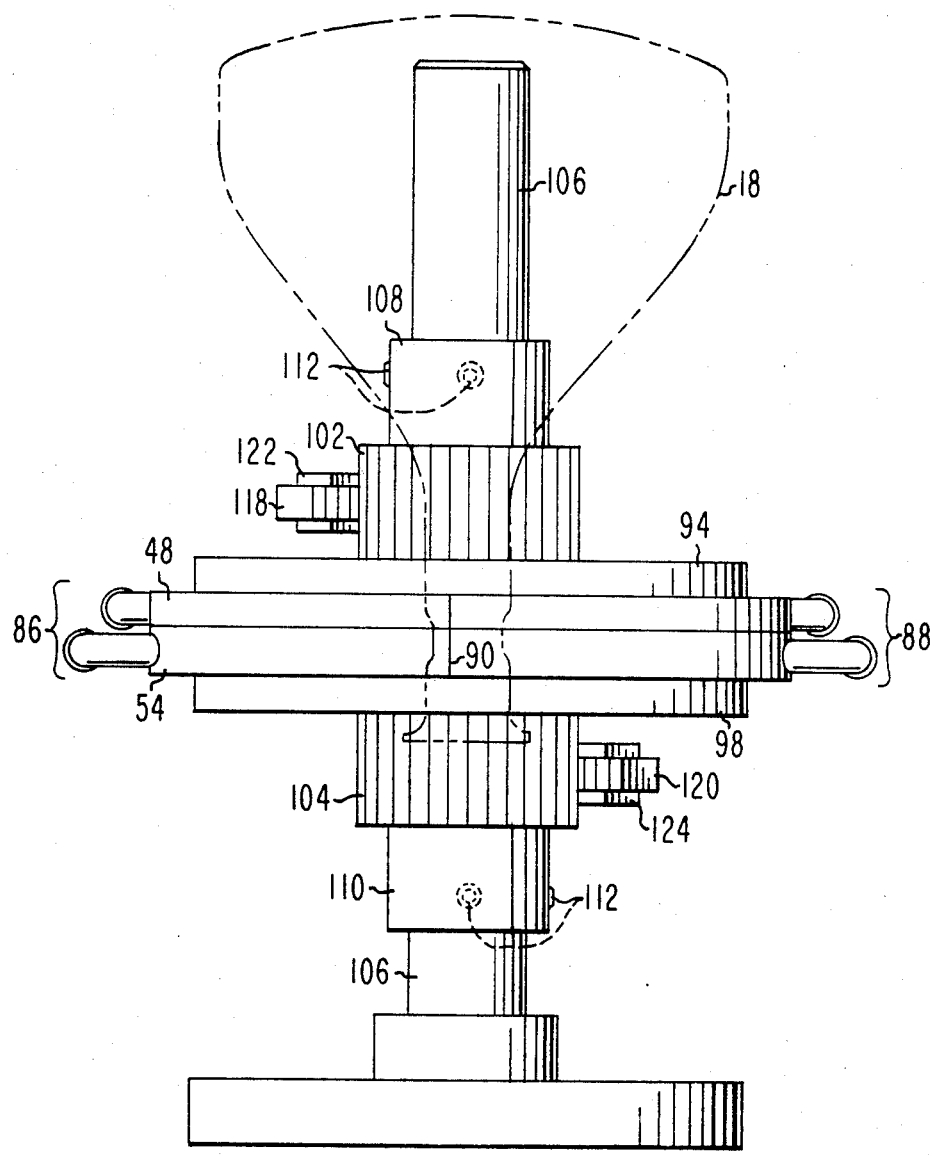
FIG. 5 is a front elevation view of the apparatus shown in FIG. 1.
Figure 6:
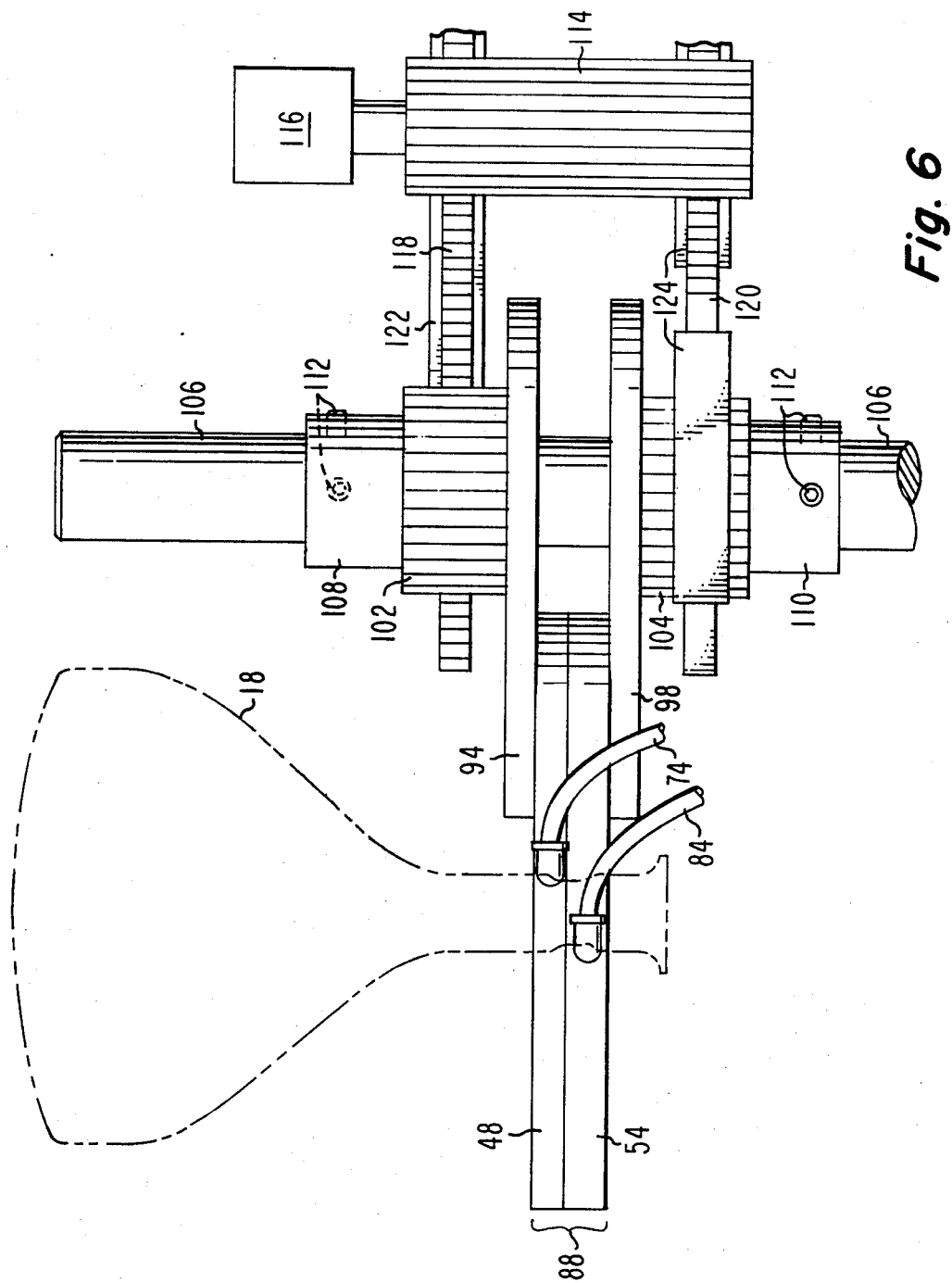
FIG. 6 is a side elevation view of the apparatus shown in FIG. 1.

The first and second tiers 36 and 42 of burner tips 38 and 44 are split into at least first and second radial segments 86 and 88 along nonradial split lines 90 and 92, as shown in FIG. 1. Each radial segment 86 and 88 is connected to means for moving the segment 86 and 88 toward and away from the neck 16. The first radial segment 86 is connected to a first circular flange 94 by machine screws 96 which pass through the first flange 94 and attach to the top of the first circular manifold 48, as shown in FIG. 1. The second radial segment 88 is connected to a second circular flange 98 by machine screws 100 which pass through the second flange 98 and attach to the bottom of the second circular manifold 54. Each circular flange 94 and 98 has an integral off-center geared collar 102 and 104, respectively, which is pivotally supported by a fixed post 106 oriented parallel to the axis A, as shown in FIGS. 5 and 6, which allows the radial segments 86 and 88 to move toward and away from the neck 16. The collars 102 and 104 rotate between a pair of adjacent bushings 108 and 110, respectively, which are affixed to the post 106 by setscrews 112, as shown in FIG. 5.

FIG. 6 shows a mechanism for rotating the first and second radial segments 86 and 88 about the shaft 106. A geared drive shaft 114, connected to a motor 116, moves first and second racks 118 and 120 back and forth, simultaneously. The first rack 118 is supported by a rail 122 and engages the geared collar 102 of the first flange 94 along one side of the post 106. The second rack 120 is supported by a pair of rails 124 and engages the geared collar 104 of the second flange 98 on the opposite side of the post 106, as shown in FIG. 1. Consequently, as the drive shaft 114 rotates clockwise, the first flange 94 is rotated clockwise, while the second flange 98 is rotated counterclockwise, thereby moving the first and second radial segments 86 and 88 away from the neck 16. When the drive shaft 114 rotates counterclockwise, the first and second radial segments 86 and 88 are moved toward the neck 16.

In practicing the present method, the cathode-ray tube 18, held by the cradle 32, proceeds along a conveyor line to a specific station whereat the tube 18 remains stationary during the mount-sealing operation. At the mount-sealing station, an alignment operation is performed first, during which the electron gun mount 12 is inserted into the neck 16 of the tube 18 and is accurately positioned with respect to the cathodoluminescent screen 22. Then, before the apparatus 10 is positioned around the neck 16 of the CRT 18, a "clamshell" type electrical resistance oven (not shown) is brought to a temperature of about 550° C., which is above the strain point for the glass used in the twenty-nine millimeter neck 16. The oven is then placed around the neck 16 for approximately 200 seconds during a preheating step. This is easily done since the stationary CRT 18 is supported by the cradle 32 without any vertical bars near the neck 16 that would interfere with the placement of such an oven. This type of oven is easy to position and control, and provides heat over a large area, thereby minimizing strain in the glass during the preheating step. Also, the glass stem 28 and glass wafer 14 are separately heated during this preheating step, and oxidation of the lead wires 30 in the mount 12 is reduced.

After removing the clamshell oven from around the neck 16, the present mount-sealing method comprises positioning the apparatus 10 around the neck 16 of the stationary CRT 18 such that the plane of the first circle is aligned along the glass wafer 14 and the second circle 46 is positioned proximate a cutoff location between the wafer 14 and the end 19 of the neck 16, as shown in FIG. 2. Preferably, the ends of the burner tips 44 in the second tier 42 are aimed to substantially intersect the perimeter of the wafer 14. The positioning step is performed by positioning the first tier 36 of burner tips 38 closer to the axis A than the perimeter of the neck 16 at its flared end 19. This positioning step is accomplished by rotating the first and second radial segments 86 and 88 about the post 106. Then, after purging the first tier 36 of burners tips 38 with oxygen, the first tier 36 is provided with the first combustible gas mixture and is ignited to provide a temperature at the neck 16 in excess of 630° C., which is the softening point of the neck glass. Flames rotate around the neck 26 in a vortical pattern and provide an even temperature distribution, so that uniform heating of the neck 16 results. The neck 16 softens due to the hot gases and "necks in" by becoming thinner and moving toward the wafer 14. Cullet (the excess neck material below the seal plane) begins to drop. During this time, the second tier 42 of burners tips 44 is being purged with oxygen.

The second tier 42 of burner tips 44 is now provided with the second combustible gas mixture and is automatically ignited by the flame from the first tier 36, which is then shut off by securing the first combustible gas mixture. This second combustible gas mixture provides a temperature at the neck above 975° C. (the melting point of the neck and wafer glass) so that the cullet is quickly cut off. Surface tension draws the thinned neck 16 up and around the bottom edges of the glass wafer 14. This same second tier 42 of burner tips 44 also causes the neck glass and the wafer glass to flow together, thereby sealing the neck 16 to the wafer 14.

Thereafter, the apparatus 10 is removed from the neck 16 by again rotating the first and second radial segments 86 and 88 about the post 106. Preferably, each segment 86 and 88 is rotated through an arc of approximately 90 degrees, thereby opening the first and the second segments 86 and 88 through a total arc of approximately 180 degrees. The clamshell oven is positioned around the neck 16 for about two minutes for an annealing step. As soon as the oven is positioned around the neck 26, power to the oven is turned off. Due to the falling glass temperature at the seal plane, the annealing step begins at about 550° C. but gradually lowers to 375° C. as heat is redistributed in the neck 16. The oven then can be removed. This results in a neck-to-wafer seal which is relatively free of strain, because of the redistribution of heat through the neck 16 by the oven.

The present invention provides a method for sealing a mount 12 in a neck 16 of a stationary cathode-ray tube 18 which does not have to be raised or lowered relative to the burner tips 38 and 44. The single second tier 42 of burner tips 44 can effectively perform both the cut-off and sealing operations at a fixed position with respect to the neck 16. In order to accomplish this, it is necessary that the second tier 42 of burner tips 44 be aimed along directions tangent to the smaller diameter circle 46, i.e., one having a diameter of about eighteen millimeters for the twenty-nine millimeter neck 16. Also, due to the fact that the optimum heating distance from the burner tip to the neck for a premixed gas burner is approximately nine millimeters, the burner tips 44 of the second tier 42 must also be positioned closer to the neck 16 in order to maintain this optimum heating distance after the neck 16 has narrowed and thinned during the neck-in step. However, the smaller diameter circle 46 is too narrow for an effective neck-in operation because it heats the neck 16 too fast and nonuniformly. Consequently, it is necessary that the first tier 36 of burner tips 38 be aimed along directions tangent to a larger diameter circle 40, i.e., one having a diameter of about twenty-two millimeters for the twenty-nine millimeter neck 16. The larger diameter circle 40, the plane of which is aligned along the wafer 14, allows the neck 16 to be heated more slowly and uniformly, producing a narrow band of heat for a controlled neck-in operation. The burner tips 38 of the first tier 36 are positioned further away from the neck 16 than the second-tier burner tips 44 in order to maintain the optimum heating distance from tip to neck. It is also important that the burner tips 44 of the second tier 42 be aimed toward the plane of the first circle 40 so as to substantially intersect the perimeter of the wafer 14. For the twenty-nine millimeter neck 16, the preferred angle is about six degrees. By aiming the second tier 42 of burner tips 44 upward so that the flames therefrom are angled up at the desired cut-off level, the sealing operation is accomplished more effectively with a significantly higher manufacturing yield.

A major advantage of the present method and apparatus is that the steps of positioning and removing the burner tips 38 and 44 are performed adjacent a stationary cathode-ray tube 18 held at a fixed sealing location along a conveyor line. This is important because the total "sweep" arc of 180 degrees allows the burner tips 38 and 44 to be removed from the sealing location, thereby making the mount alignment and preheating steps more convenient at that location. Such steps may now be easily automated at the sealing location. Also, the present method and apparatus allow the mount-sealing operation to be performed on a tube having a flared neck, where the burner tips are positioned closer to the neck than the perimeter of the neck at its flared end.

What is claimed is:

1. A method for sealing a mount including a wafer in a neck of a stationary cathode-ray tube oriented along an axis comprising:

positioning a first tier of burner tips completely around the neck of said cathode-ray tube at a first distance therefrom such that said burner tips are aimed nonradially along directions tangent to a first circle, the plane of said first circle being aligned along said wafer, said first tier of burner tips being split into at least first and second radial segments, each segment being connected to means for moving the segment toward and away from the neck;

providing a vortical pattern of flames around the neck from said first tier of stationary burner tips; and removing said radial segments from around the stationary neck of said cathode-ray tube sufficiently to allow said tube to proceed along a conveyor line.

2. A method as recited in claim 1 wherein the neck of said cathode-ray tube is flared at the end thereof, and said positioning step is performed by positioning said first tier of burner tips closer to said axis than the perimeter of the flared end of said neck.

3. A method as recited in claim 1 wherein said moving means comprises first and second flanges connected, respectively, to said first and said second radial segments, each flange being pivotally supported by a post oriented parallel to said axis in a manner whereby said positioning and said removing steps are performed by rotating said first and said second segments about said post.

4. A method as recited in claim 3 wherein said rotating step is performed by rotating each segment through an arc of approximately 90 degrees, thereby opening said first and said second segments through a total arc of approximately 180 degrees.

5. A method as recited in claim 1 further comprising the steps of positioning a second tier of burner tips completely around the neck of said cathode-ray tube adjacent said first tier at a second distance from said neck such that the burner tips of said second tier are aimed nonradially along directions tangent to a second circle, said first distance and the diameter of the first circle being greater, respectively, than said second distance and the diameter of the second circle, said second tier of burner tips also being split into similar segments attached to said first and said second segments such that said second circle is positioned proximate a cutoff location between said wafer and the end of said neck; and providing a vortical pattern of flames around the neck from second tier of stationary burner tips.

6. A method as recited in claim 5 wherein the burner tips of said first tier are aimed along the plane of said first circle, and the burner tips of said second tier are aimed toward the plane of said first circle at a predetermined angle.

7. A method as recited in claim 6 wherein the ends of the burner tips in said second tier are aimed to substantially intersect the perimeter of said wafer, and said predetermined angle is about six degrees.

8. A method as recited in claim 5 wherein said first tier of burner tips is connected to means for providing a first combustible gas mixture, and said second tier of burner tips is connected to means for providing a second combustible gas mixture different from said first mixture.

9. A method as recited in claim 8 wherein each of said providing means comprises a circular manifold having a pair of chambers, each chamber communicating with a portion of said burner tips.

10. A method as recited in claim 8 wherein said providing steps are performed by:

firstly, providing the first tier of burner tips with the first combustible gas mixture and igniting the first tier, whereby the neck becomes thinner and moves toward the wafer;

secondly, providing the second tier of burner tips with the second combustible gas mixture so as to automatically ignite the second tier, at which time the first combustible gas mixture is shut off, whereby excess neck material below the wafer is cut off; and continuing to provide said second tier with the second combustible gas mixture until the neck is sealed to the wafer.

11. Apparatus for sealing a mount in a neck of a cathode-ray tube oriented along an axis comprising a first tier of burner tips disposed completely around said axis at a first distance therefrom and similarly aimed nonradially along directions tangent to a first circle, said first tier of burner tips being split into at least first and second radial segments, each segment being connected to means for moving the segment toward and away from the neck.

12. Apparatus as defined in claim 11 wherein said moving means comprises first and second flanges connected, respectively, to said first and said second radial segments, each flange being pivotally supported by a post oriented parallel to said axis.

13. Apparatus as defined in claim 11 further comprising a second tier of burner tips disposed completely around said axis at a second distance therefrom and aimed nonradially along directions tangent to a second circle, said first distance and the diameter of the first circle being greater, respectively, than said second distance and the diameter of the second circle, said second tier of burner tips also being split into similar segments attached to said first and said second segments.

14. Apparatus as defined in claim 13 wherein the burner tips of said first tier are aimed along the plane of said first circle, and the burner tips of said second tier are aimed toward the plane of said first circle at a predetermined angle.

* * * * *